US005317501A

United States Patent [19]

Hilpert

[11] Patent Number: 5,317,501

[45] Date of Patent: May 31, 1994

[54] CONTROL SYSTEM FOR A NUMERICALLY CONTROLLED MACHINE

[76] Inventor: Bernhard Hilpert, Balingerstrabe 3, D-7140 Ludwigsburg, Fed. Rep. of Germany

[21] Appl. No.: 420,902

[22] Filed: Oct. 13, 1989

Related U.S. Application Data

[63] Continuation-in-part of Ser. No. 107,440, Oct. 13, 1987, abandoned.

[51] Int. Cl.5 .............. G06F 15/46

[52] U.S. Cl. .............. 364/132

[58] Field of Search .............. 364/132

[56] References Cited

U.S. PATENT DOCUMENTS

| | | | |
|---|---|---|---|
| 3,737,873 | 6/1973 | Puccini | 364/200 |
| 4,028,675 | 6/1977 | Frankenberg | 364/900 |
| 4,400,771 | 8/1983 | Suzuki et al. | 364/200 |
| 4,414,624 | 11/1983 | Summer, Jr. et al. | 364/200 |
| 4,454,575 | 6/1984 | Bushaw et al. | 364/200 |
| 4,620,118 | 10/1986 | Barber | 364/200 |
| 4,689,751 | 8/1987 | Fujimoto | 364/167 |
| 4,739,468 | 4/1988 | Fujimoto | 364/171 |
| 4,787,049 | 11/1988 | Hirata et al. | 364/474.15 |
| 4,796,232 | 1/1989 | House | 364/900 |
| 4,888,726 | 12/1989 | Struger et al. | 364/200 |
| 4,912,633 | 3/1990 | Schweizer et al. | 364/200 |
| 4,977,494 | 12/1990 | Gabaldon et al. | 364/132 |

*Primary Examiner*—Jerry Smith

*Assistant Examiner*—Patrick D. Muir

*Attorney, Agent, or Firm*—Helfgott & Karas

[57] ABSTRACT

A control system is proposed which is integrated in a single housing and is designed for a numerically controlled machine. The control system comprises a PC board which includes an input device, a processor, a memory, and a PC bus; a plurality of CNC boards, each including a processor, a memory, and a CNC bus; a common control-system bus connected to the CNC bus of each CNC board; and a PC matching circuit provided between the control-system bus and the PC bus. The matching circuit includes a read-write memory, an address multiplexer, a bidirectional data multiplexer, and a control circuit, which depending on the control signals on the control lines of the control-system bus and the PC bus, drives the address multiplexer, the bi-directional data multiplexer, and the read-write memory such that by the control-system bus and also by the PC bus, data can be written into and read out from the read-write memory under desired addresses.

7 Claims, 4 Drawing Sheets

CONTROL SYSTEM FOR A NUMERICALLY CONTROLLED MACHINE

CROSS-REFERENCE TO RELATED APPLICATION

This application is a continuation-in-part of application Ser. No. 107,440 filed Oct. 13, 1987 and now abandoned.

FIELD OF THE INVENTION

The present invention concerns a control system for a numerically controlled machine, especially a machine tool, with a personal computer board and a CNC board. Such control systems make it possible to control a machine tool, which is driven by way of the CNC board, by means of a personal computer that is formed by the PC board.

BACKGROUND OF THE INVENTION

In a known, computer-supported control system, which is described in the U.S. patent application Ser. No. 4,787,049 (Hirata at al), a personal computer is provided which, in usual fashion, comprises a microprocessor, a ROM, a read-write memory, and a disk memory. Furthermore, as is generally usual, the personal computer comprises a monitor and a keyboard. The individual components of the personal computer are connected via interface circuits to an internal PC bus of the personal computer. On the output side, the personal computer is connected to a sequence controller via an interface circuit that is connected to the PC bus. The abbreviation "PC" throughout the specification means "personal computer". The sequence controller tool or to drive a numerical control unit, which Is connected to the axis drivers of a machine tool via driver units. The known control system therefore essentially Involves two separate units, namely the personal computer on the one hand and the CNC on the other hand, which are connected together by a control, which can essentially be regarded as a serial interface. Such a control system on the one hand is comparatively slow due to the high data density which must be transmitted between the personal computer and the CNC via the sequence controller and, on the other hand, is suited only to drive a single CNC and a single machine tool.

From the technical publication ISIS Engineering Report 1987, 5th year, Volume 1, April–October, Pages 3002–3005, a control system is known, with a personal computer which comprises a PC bus, and with a CNC that is connected to the PC directly via a parallel port. The CNC on its part is connected, via another parallel port, to a machine-tool driver-circuit, designated by "SPS". Every transmission of data from the PC to the control runs through the CNC and loads the latter. Thus this system ia not suited to work with more than a single CNC.

SUMMARY OF THE INVENTION

Compared to this prior art, it is an object of the present invention to develop further a control system for a numerically controlled machine, especially for a numerically controlled machine tool, so that, despite the simple, integrated structure of the overall system, the data quantities being handled will create a lesser load on the individual units of the control system.

This objective is achieved by a control system, integrated into a single housing, for at least one numerically controlled machine, especially a machine tool, with a PC board comprising an input device; a processor, a memory, and a PC bus, with at least one CNC board, preferably a plurality of CNC boards, each comprising a processor, a memory, and a CNC bus, with a single common control-system bus, which is connected to the CNC bus of each CNC board, and with a PC matching circuit between the control-system bus and the PC bus. The matching circuit comprises: a read-write memory; an address multiplexer, whose output is connected to an address input of the read-write memory, and whose input is connected on the one hand to the address lines of the control-system bus and on the other hand to the address lines of the PC-bus; a bidirectional data multiplexer, which on one side is connected to the data connections of the read-write memory and on the other side is connected on the one hand to the data lines of the control-system bus and on the other hand to the data lines of the PC bus, and which contains a control circuit whose input side is connected to the control lines of the control-system bus and of the PC bus, and whose output side is connected to the switch-over inputs of the address multiplexer and data multiplexer as well as to a read-write switch-over input of the read-write memory. Depending on the control signals on the control lines of the control-system bus and the PC bus, it drives the address multiplexer, the data multiplexer, and the read-write memory in such a fashion that, by way of the control-system bus and also by way of the PC bus, data can be written into and read out from the read-writs memory under desired addresses.

The inventive control system represents an integrated system which is integrated into a single housing not only in the mechanical sense but is also functionally integrated by the joining of the PC and the CNC through the single, common control-system bus. In contrast to the systems of the prior art described above, in which a functionally independent PC and a functionally independent CNC are merely connected together through an interface, the inventive system makes possible a very flexible mode of data handling. Thus; for example, work-piece data in the ISO code, which were stored on a disk memory of the PC, can be written directly into the read-write memory of the PC matching circuit, from where they can be called from one of the plurality of CNCs, via the system bus. In this case, after the data have been processed by the CNC, control instructions are again given to an IO board via the system bus, the IO board likewise being connected to the system bus and creating control instructions for the machine tool. While these data are being transmitted, both the memory and the processor of the PC board are not loaded by the data quantity that is being handled.

When work pieces are being programmed, the user can design the work piece at the PC, by means of standard programs, such as for example CAM or CAD, and the design data can be directly transmitted to the CNC. The operator of the PC can also correct the work-place data, for example, by way of a program which runs in the PC under the MS-DOS operating system. Nevertheless, the corrections can be directly forwarded to the machine tool.

BRIEF DESCRIPTION OF THE DRAWINGS

Preferred embodiments of the inventive control system are explained in more detail below, with reference to the attached drawings.

DESCRIPTION OF THE PREFERRED EMBODIMENT

Figure 1:
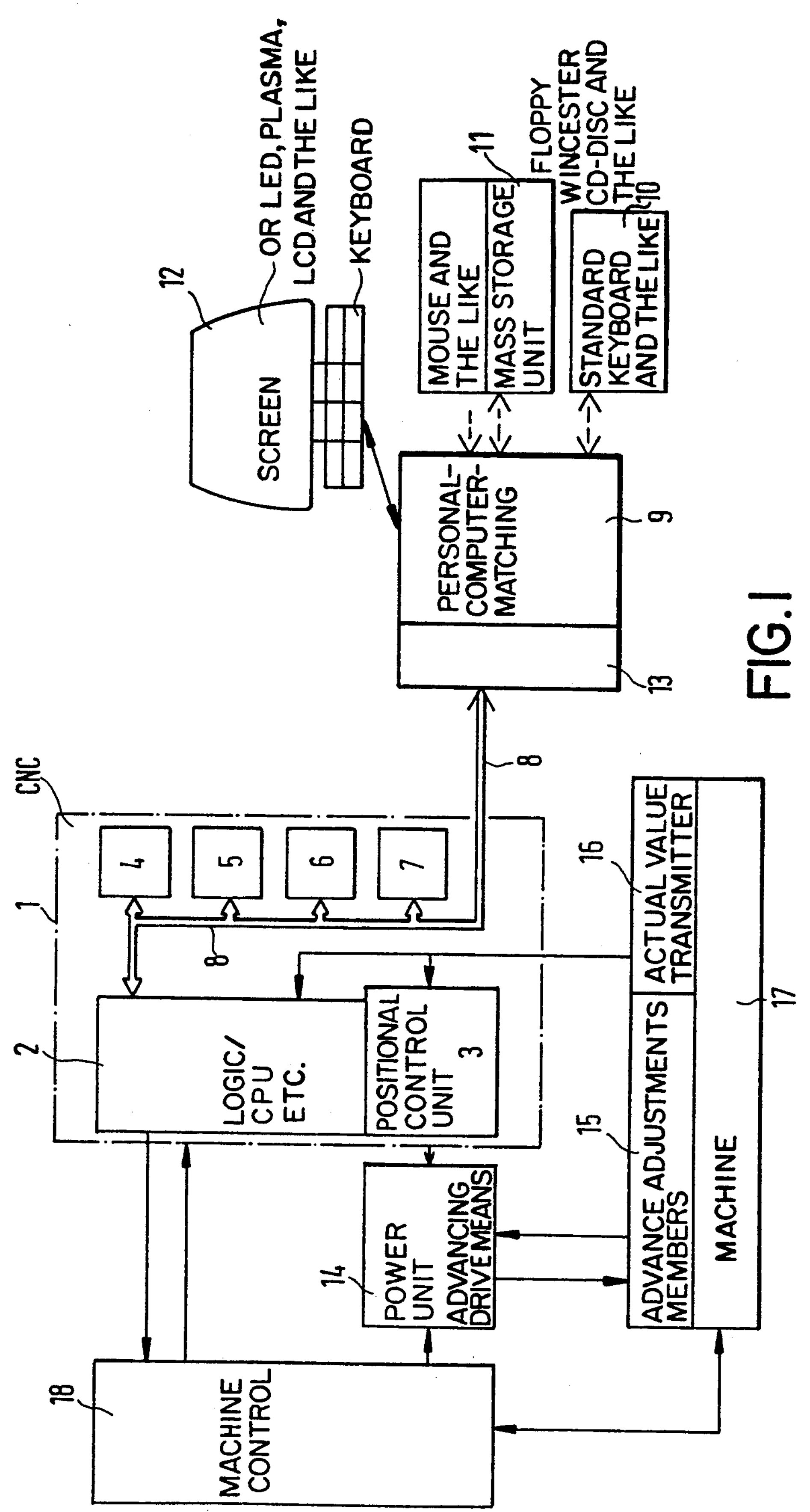
FIG. 1 shows a diagrammatic representation of the control system.

As shown in FIG. 1, the computer-supported numerical control device (CNC) has the usual structure with a processor 2, which also contains logic and computing parts as well as a position control 3 for the machine control. Furthermore, the CNC contains several memories 4, 5, 6, and 7. Depending on the structure, these memories are implemented as RAM, ROM, EPROM, etc. These memories store the software for the most various purposes such as main memory, memory for the operating program, parts program, parameter and correction values, etc.

These memories 4 through 7 are connected to a data bus 8, which on its part is also connected to the processor 2. In principle this involves a bundle of several electrical lines. The CNC 1 is also equipped with the above-mentioned position control 3, which controls a power section 14. The actual machine control 18, which is controlled by the CNC control device, is coupled to feed drives (in the power section 14). These feed drives control feed actuators 15 of the machine or machine tool 17. On their part, these transmit the position values of their movable elements, via the actual-value transmitter 16, to the CNC control, i.e. the position control 3 and the processor 2.

The data bus 8 is brought out from the CNC 1, as is indicated by its crossing with the dashed line. A read-write memory 133 and a personal-computer matching circuit 9 is connected at this point of the data bus. The personal-computer matching circuit 9 is matched to a standard operating system such as MS-DOS, UNIX, CPM, and the like and thus fulfills the operating conditions of a personal computer. The personal-computer matching circuit 9 consequently can work with every already existing PC (personal computer) software packet of the respective standard system. The only thing still required is that data can be exchanged between the personal-computer matching circuit 9 and the CNC 1. These data are exchanged via the read-write memory 13 and the data bus 8. This read-write memory Is here preferably a dual port RAM. But It can also be a communication memory, a DMA, a Winchester drive, a floppy disk, a Bernoulli box, or a CD disk. Data can also be transmitted over high-speed channels such as MAP, Ethernet, or the like. In this connections a data transmission rate of at least 10K byte/see is chosen.

The personal-computer matching circuit 9 can be driven via all customary data input devices, for example via a standard keyboard 10, a mass memory 11, which, for example, can be a floppy disk, a Winchester drive, a CD disk, or the like. Other known input devices such as a "pointing device", MOUSE, etc. can also be used for input. As a result, the operator or programmer can rely on well-known operating elements and measures with which he is familiar from his personal computer. The machine-tool control thus presents itself to the operator in the fashion of his familiar personal computer, if e.g. a monitor or a plasma display 12 with its keyboard is connected as an output device to the personal-computer matching circuit 7.

The operator and programmer can have recourse to a plurality of already existing PC software packets and can integrate additional functions into the control of the machine tool. This is not possible with commercial machine-tool controls, since these are always designed only for a specific application. By means of the personal-computer matching circuit 7 and the personal computer software suited for this, functions such as graphics interfaces, data entry programs, logistic functions, as well as linking functions for master computers, and the like can be integrated into the machine-tool control, The machine-tool control according to the invention offers access to worldwide software standards and software tools and furthermore significantly improves communication between the operator or programmer and the machine tool.

The personal-computer matching circuit 9 is designed for the standard operating system of a personal computer, so that all commercially available PC software packets of -this standard operating system can be integrated into the machine-tool control.

The personal-computer matching circuit 9 and the read-write memory 13 are structurally and mechanically combined in the CNC control 1, i.e. are housed in the same housing and preferably even on the same PC board. But it can also be housed so as to be replaceable, for example through plug connectors, so that personal-computer matching circuits 9 designed for different standard systems can be used. It is also possible already to Integrate several different personal-computer matching circuits 9 into the CNC, these different personal-computer matching circuits being designed for different standard operating systems. In this way, the user may always activate one of them without mechanical intervention, for example through switching instructions, which are entered on the data entry device.

The block diagram of the inventive control system will be elucidated below with reference to FIG. 2. A PC board, designated in its totality by the reference symbol 20, comprises in well-known fashion a processor 21, a graphics unit 22, by means of which a monitor 23 is driven, a serial/parallel I/O interface 24 which is connected to a keyboard 25, a disk memory control 26, which is connected to a drive for hard disks or floppy disks 27, as well as a memory 28 which comprises a read-write memory and a read-only memory. The processor 21, the graphics unit 22, the I/O interface 24, the disk memory control 26, and the memory 28 are connected to a PC bus. In contrast to conventional PC boards, the PC board 20 according to the invention also comprises a matching circuit 30, which will be explained in more detail later, with reference to FIGS. 3 and 4. It matches the PC bus 29 to a single, common control-system bus 31. In the preferred embodiment, the single, common control-system bus 31 is a bus of the type "multibus".

Figure 3:
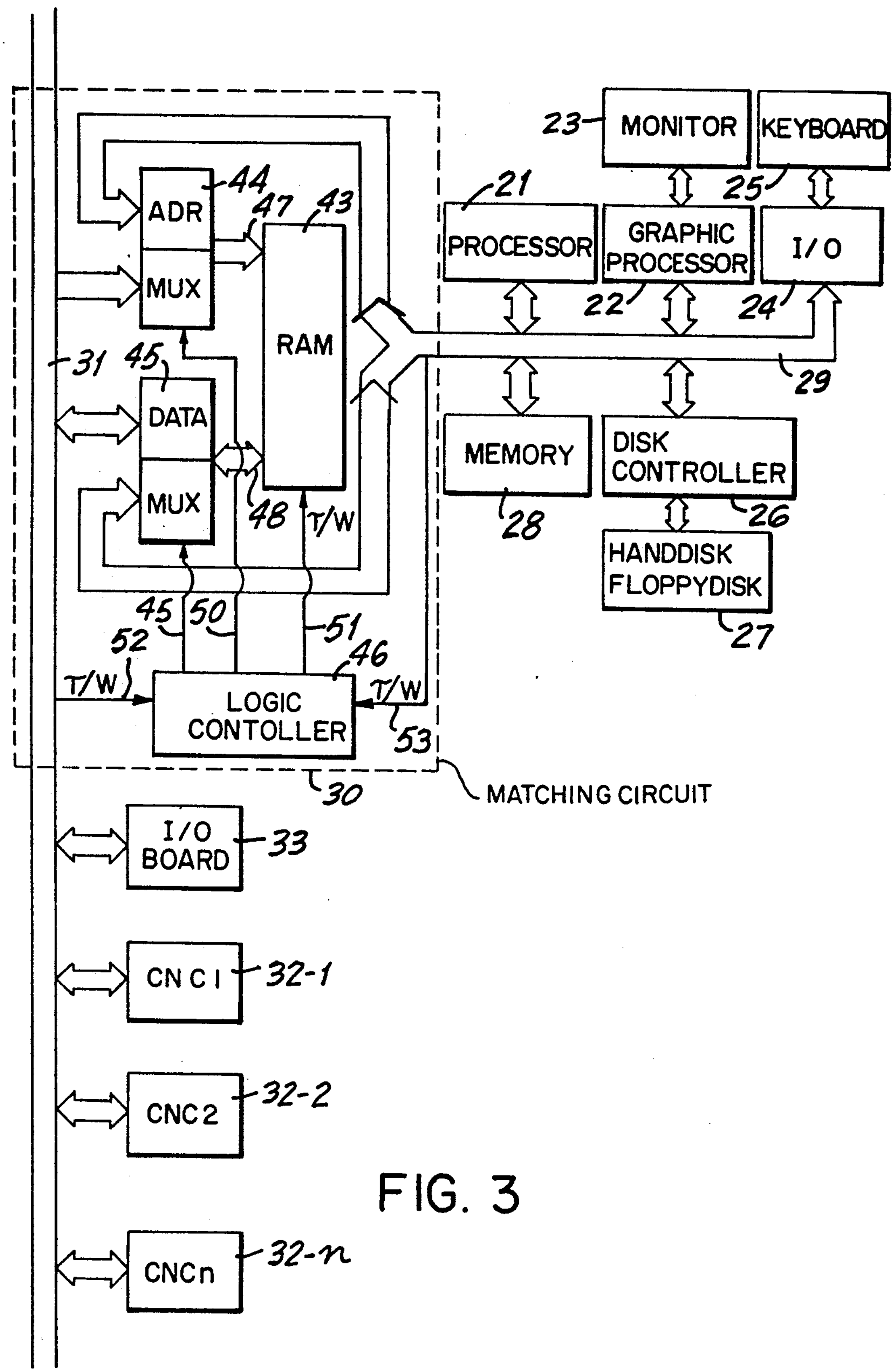
FIG. 3 shows a detailed representation of the control system shown in FIG. 2, with a preferred embodiment of the matching circuit.

The control-system bus connects the PC board 20 to at least but preferably to a plurality of CNC boards 32, as can be seen more clearly especially in FIG. 3. Furthermore, at least I/O board 33 is connected to the control-system bus 31. However, with a practically implemented design form, here too a plurality of I/O boards 33 is provided and is connected to the control-system bus 31.

Each CNC board 32 comprises a CNC bus 34, to which are connected a processor 35, a peripheral unit 36, and a memory 37, comprising a read-write memory and a read-only memory. The CNC bus 34 is connected to the control-system bus 31 via a multibus logic master circuit, if the control-system bus is designed as multibus I/II. The multibus logic master circuit 38 of the CNC board 32 is a commercially available circuit element.

Each I/O board 33 has an I/O bus 39, to which various peripheral units 40, 41 are connected. For example, these may be driver circuits for the actuators of machine tools.

A multibus logic slave circuit 42, likewise available commercially, is situated between the control-system bus 31 and the I/O board 33.

Figure 2:
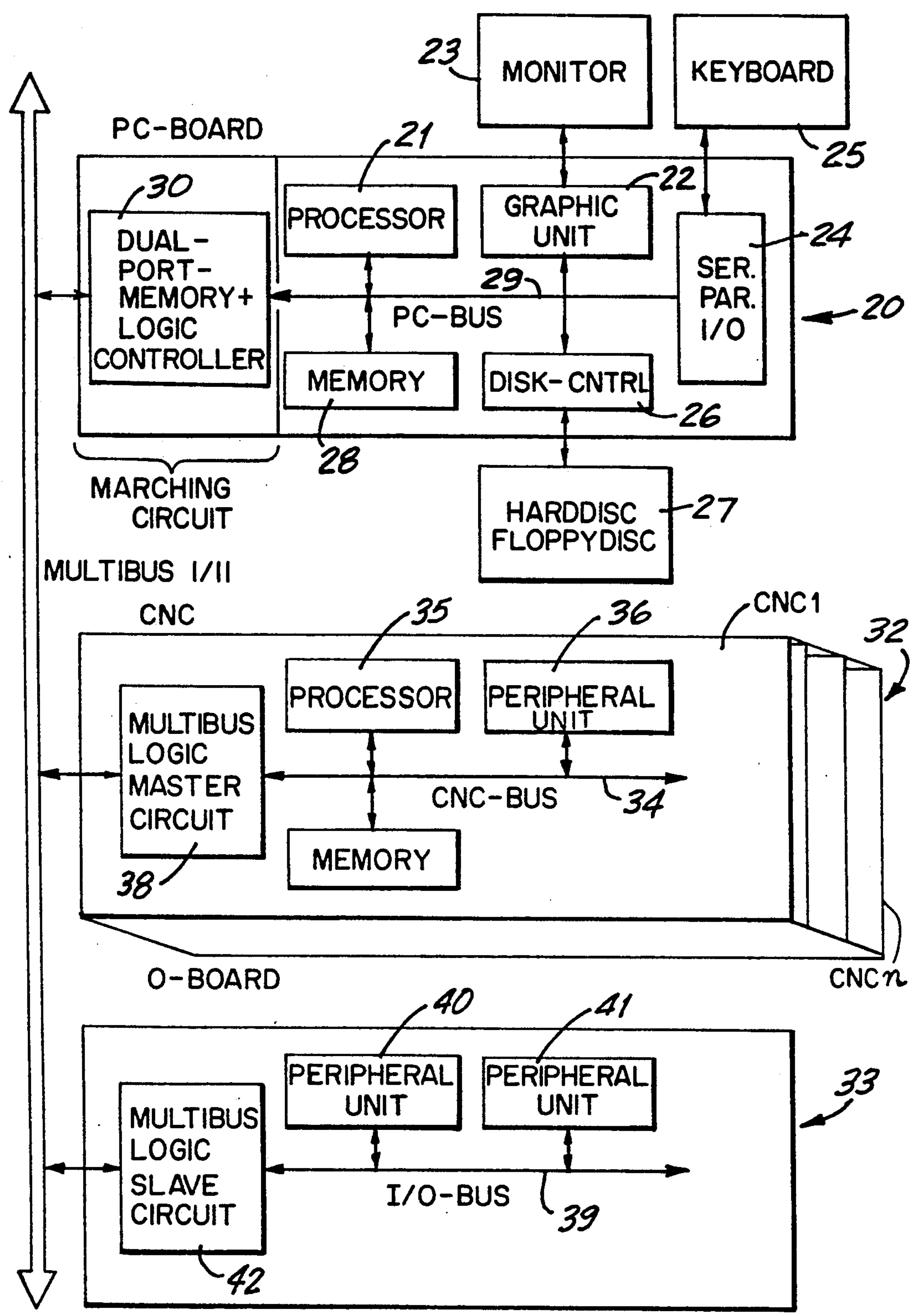
FIG. 2 shows a block circuit diagram of the control system.

In FIG. 3, the circuit parts that agree with FIG. 2 are designated by the same reference symbols, so that another description of already explained circuit parts can be omitted. Consequently, the following explanation will be limited essentially to the matching circuit 30, which is shown in detail in this figure.

Purely for reasons of completeness, it should-be noted that in FIG. 3, in contrast to the embodiment according to FIG. 2, the individual CNC boards are designated by reference symbols 32-1, 32-2, . . . , 32-n.

As is further shown in FIG. 3, the matching circuit 30 comprises a dual-port memory 43–45 with a logical control 46. The dual-port memory 43–45 essentially comprises a RAM 43 with an address input 47 and data connections 48, an address multiplexer 44, whose input is connected on the one hand to the address lines of the PC bus 29 and on the other hand to the address lines of the control-system bus 31, and whose output is connected to the address input 47 of the RAM 43, as well as a data multiplexer 45, which on one side is connected on the one hand to the data lines of the PC bus 29 and on the other hand to the data lines of the control-system bus 31, and on the other side is connected to the data connections 48 of the RAM 43. Switch-over lines 49, 50 from the logical control 46 lead to the two multiplexers 44, 45. The logical control 46 furthermore controls the RAM 43 by means of a read-write instruction line 51, over which the read operating mode and the write operating mode of the RAM 43 is optionally switched. The logical control 46 on its part is connected to at least one control line of the control-system bus 31 via a control line 52, and is connected to a control line of the PC bus 29 through a control line 53. The logical control 46 controls the address multiplexer 44, the data multiplexer 45, and the RAM 43, in dependence on control signals on the PC bus 29 and on the control-system bus 31, in such a fashion that, through the control-system bus 31 and also through the PC bus 29, data are written into the RAM 43 under the desired addresses, and also can be read out from there.

Figure 4:
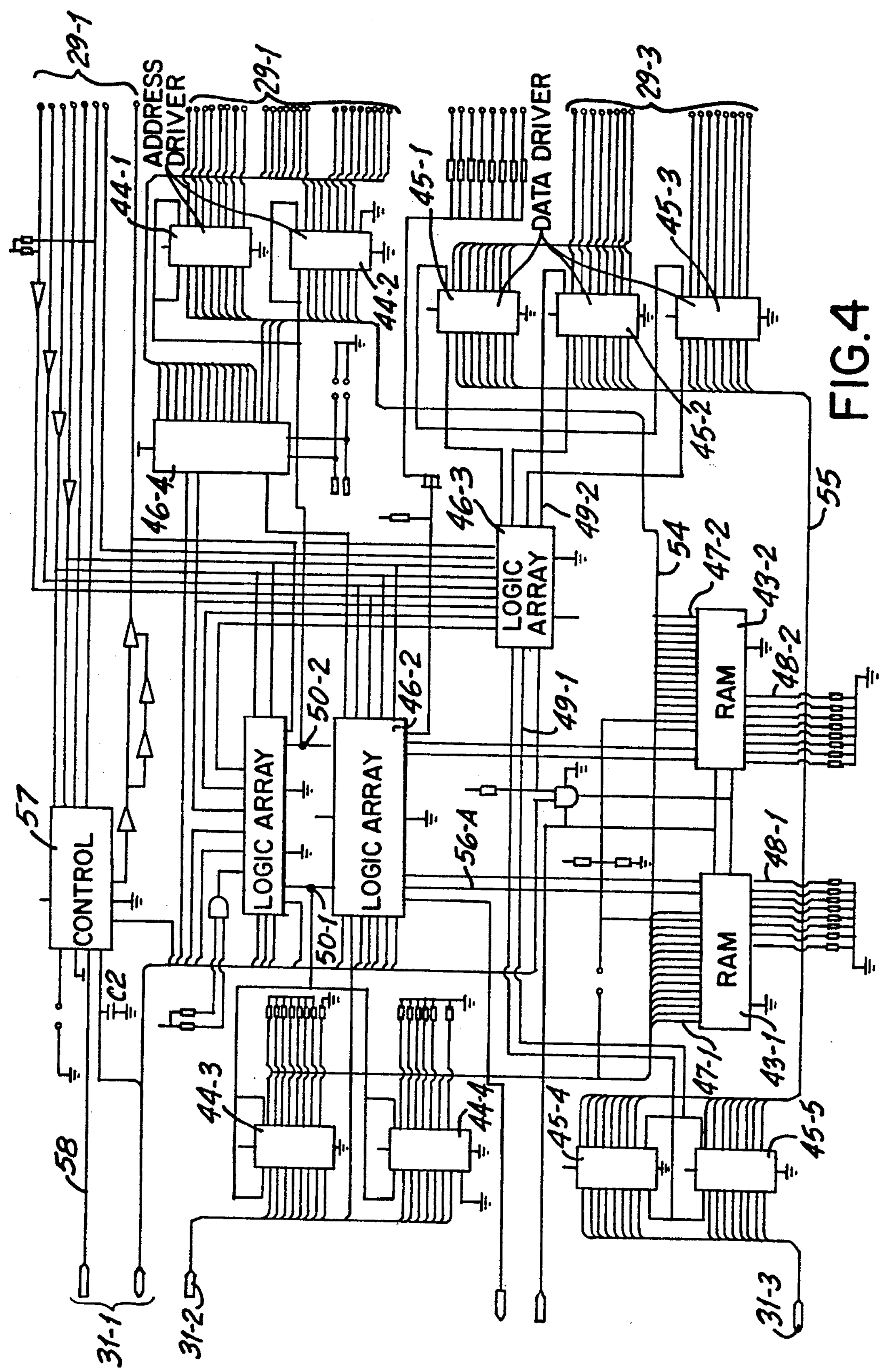
FIG. 4 shows a detailed circuit diagram, such as is used with a practically realized embodiment of the inventive control system, this embodiment being regarded as a preferred one.

A detailed circuit diagram of a preferred and practically implemented embodiment of the matching circuit 30 will be explained below, with reference to FIG. 4. In the drawing of FIG. 4, the PC bus runs vertically on the right side (not shown) and the control-system bus 31 runs vertically on the left side (likewise not shown), the latter being designed as multibus I/II. The PC bus 29 essentially comprises the PC bus control lines 29-1, the PC bus address lines 29-2, and the PC bus data lines 29-3. The control-system bus on its part comprises essentially the control-system bus control lines 31-1, the control-system bus address lines 31-2, as well as the control-system bus data lines 31-3.

The PC-bus address lines 29-2 are connected to a first and a second address driver 44-1, 44-2. The control-system bus address lines 31-2 are connected to a third and a fourth address driver 44-3, 33-4. On the output side, the address drivers 44-1, 44-2, 44-3, 44-4 are connected to an address bus 54, which is connected to the address inputs 47-1, 47-2 of two RAM chips 43-1, 43-2. The data connections 48-1, 48-2 of the RAM chips 43-1, 43-2 are connected to a data bus 55. The latter is connected on the one hand to the PC bus data lines 29-3, via a first, second, and third data driver 45-1, 45-2, and 45-3, and on the other hand is connected to the control-system bus data lines 31-3, via a fourth and fifth data driver 45-4, 45-5.

The first, second, third and fourth address driver 41-1, 41-2, 41-3, and 41-4 be activated optionally through the switch-over lines 50-1, 50-2. Thus in dependence on the control potentials on the switch-over lines 50-1, 50-2, the PC-bus address lines 29-2 or the control-system bus address lines 29-2 or the control-system bus address lines 31-2 can optionally be switched onto the address bus 54. Accordingly, the first, second, third, fourth, and fifth data driver 45-1, 45-2, 45-3, 45-4, 45-5 can be activated through the switch-over lines 49-1, 49-2, so that the data bus 55 can be connected optionally to the PC-bus data lines 29-3 or the control-bus data lines 31-3. In virtue of being alternatively activatable, the address drivers 44-1 through 44-4 and the data drivers 45-1 through 45-5 operate as address multiplexers 44 and data multiplexers 45 respectively.

Four programmable logic-array-chips 46-1, 46-2, 46-3, 46-4 are connected to the control-system bus control lines 31-1 and the PC-bus control lines 29-1, in order to generate the above-described switch-over signals on the switch-over lines 49-1, 49-2, 50-1, 50-2 for the address multiplexer 44 and the data multiplexer 45, and further in order to conduct a read-write instruction signal to the RAM chips 43-1, 43-2 on the read-write lines 51-1, 51-2. Furthermore, the second logic.-array-chip 46-2 generates control signals for the output enable lines 56-1, 56-2. When a control-signal potential is applied to these, data from the RAM chips 43-1, 43-2 under the activated address are placed on the data bus 55.

The logic-array-chips 46-1, 46-2, 46-3, 46-4 in their totality form the logical control 46 according to FIG. 3.

The logic-array-chips 46-1, 46-2, 46-3, 46-4 involve programmable gate arrays which can be procured from the firm Lattice Semiconductor Corp., and which have the following types: The first logic-array-chip 46-1 is type "GAL 16 V8", the second logic-array-chip 46-2 is Type "GAL 20 V8A", the third logic-array-chip 46-3 is Type "GAL 16 V8B", and the fourth logic-array-chip 46-4 is Type "GAL 20 V8".

The logical equations, for whose -execution these logic-array-chips are permanently programmed, can be seen from the tables below Consequently no further explanation is needed of the way in which these circuit modules function.

Furthermore, the logical control comprises an access enable control-circuit 57, to which the clock-pulse signal from the system-control bus is conducted on a clock-pulse line 58, and to which furthermore the PC-bus control lines 29-1 are conducted. On the basis of control-line signals on the PC-bus control lines 29-1, the access enable control-circuit 57 senses whether a read-write cycle has been completed on the PC bus 29. If this is the case, an enable signal ia placed on an appropriate control line of the control-system bus 31, so that, by means of this, the RAM chips 43-1, 43-2 can be accessed.

TABLE I

LOGIC ARRAY CHIP 46-1

```
/** Inputs **/
PIN 1  =CLK        ;   /*          */
PIN 2  =!RST       ;   /*          */
PIN 3  =!MRDC      ;   /*          */
PIN 4  =MRW        ;   /*          */
PIN 5  =!LOCKS     ;   /*          */
PIN 6  =!DPRMCS    ;   /*          */
PIN 7  =LOCKM      ;   /*          */
PIN 8  =!DPRSCS    ;   /*          */
PIN 9  =!MWTC      ;   /*          */
PIN 11 =TEST1      ;   /*          */
/** Outputs **/
PIN 12 =!XACK      ;   /*          */
PIN 13 =!Q1        ;   /*          */
PIN 14 =!DPSRDY1   ;   /*          */
PIN 15 =!XACK1     ;   /*          */
PIN 16 =!DPRGM     ;   /*          */
PIN 17 =!DPRGS     ;   /*          */
PIN 18 =!Q0        ;   /*          */
PIN 19 =!DPSRDY    ;   /*          */
/** Declarations and Intermediate Variable Definitions **/
A =!DPSRDY1 & !DPRGS & !XACK1 & !DPRGM;
B =!DPSRDY1 & !DPRGS & !XACK1 & DPRGM;
S0 =!Q0 & !Q1 & A;
S1 =!Q0 & !Q1 & B;
S2 =!Q0 & Q1 & B;
S3 =Q0 & Q1 & !DPSRDY1 & !DPRGS & XACK1 & DPRGM;
S4 =Q0 & Q1 & B;
S5 =Q0 & !Q1 & A;
S6 =!Q0 & !Q1 & !DPSRDY1 & DPRGS & !XACK1 & !DPRGM;
S7 =!Q0 & !Q1 & DPSRDY1 & DPRGS & !XACK1 & !DPRGM;
S8 =!Q0 & Q1 & A;
/** Tristate Equations **/
XACK.OE=DPRMCS;
/** Logic Equations **/
XACK   =XACK1 & MRDC & !RST # XACK1 & MWTC &
!RST;
Q1.D   =!RST & (S3 & DPRMCS # S7 & DPRMCS & !MRW #
  S8 & !MRW & LOCKS #S1 & DPRMCS & MRDC #
  S1 & DPRMCS & MWTC # S2 & DPRMCS # (S3 # S4) &
!DPRMCS & LOCKM #
  S7 & !DPRMCS & !MRW & LOCKS);
DPSRDY1.D=(S6 # S7) & DPRSCS & MRW & !RST;
XACK1.D =!RST & (S2 & DPRMCS # S3 & DPRMCS &
MRDC # S3 & DPRMCS & MWTC);
DPRGM.D =!RST & (S1 & DPRMCS # (S3 # S4) &
DPRMCS # S1 & !DPRMCS & LOCKM #
  S2 & DPRMCS # S0 & DPRMCS & MRDC # S0) &
DPRMCS & MWTC #
  S8 & DPRMCS & (!DPRSCS # !MRW) & !LOCKS # (S3 # S4)
&!DPRMCS & LOCKM);
DPRGS.D =!RST & (S0 & !DPRMCS & DPRSCS &
MRW # (S6 # S7) & DPRSCS & MRW #
  S5 & !DPRMCS & DPRSCS & MRW & !LOCKM # S8 &
DPRSCS & MRW & LOCKS);
Q0.D   =!RST & (S3 & DPRMCS # (S3 # S4) &
!DPRMCS & DPRSCS & MRW & !LOCKM #
  S1 & !DPRMCS & DPRSCS & MRW & !LOCKM # (S3 # S4) &
!DPRMCS & LOCKM #
  S2 & DPRMCS);
DPSRDY =DPSRDY1 & DPRSCS & !RST;
```

TABLE II

LOGIC ARRAY CHIP 46-2

```
/** Inputs **/
PIN 1   =!DPRGS    ;  /*          */
PIN 2   =!DPASCS   ;  /*          */
PIN 3   =!MR       ;  /*          */
PIN 4   =!MW       ;  /*          */
PIN 5   = AO       ;  /*          */
PIN 6   =!BHE      ;  /*          */
PIN 7   =!DPRGM    ;  /*          */
```

TABLE II-continued

LOGIC ARRAY CHIP 46-2

```
PIN 8   =!DPAMCS   ;  /*          */
PIN 9   =!MRDC     ;  /*          */
PIN 10  =!MWTC     ;  /*          */
PIN 11  =!ADRO     ;  /*          */
PIN 13  =!BHEN     ;  /*          */
PIN 14  = TEST     ;  /*          */
PIN 23  =!RST      ;  /*          */
/** Outputs **/
PIN 15  =!DPHIWR   ;  /*          */
PIN 16  =!DPHIRD   ;  /*          */
PIN 17  = DPRSI    ;  /*          */
PIN 18  =!Y2       ;  /*          */
PIN 19  = DPRMI    ;  /*          */
PIN 20  =!Y1       ;  /*          */
PIN 21  =!DPLOWR   ;  /*          */
PIN 22  =!DPLORD   ;  /*          */
/* Tristate equations */
DPHIWR.OE   =!TEST ;
DPHIRD.OE   =!TEST ;
DPLOWR.OE   =!TEST ;
DPLORD.OE   =!TEST ;
DPRMI.OE    =!TEST ;
Y1.OE       =!TEST ;
Y2.OE       =!TEST ;
DPRSI.OE    =!TEST ;
/** Logic Equations **/
DPHIWR = DPRGS & MW & BHE # DPRGM & MWTC &
  BHEN # DPRGM & MWTC & ADRO & !BHEN;
DPHIRD = DPRGS & MR & BHE # DPRGM & MRDC &
  BHEN # DPRGM & MRDC & ADRO & !BHEN;
DPLOWR = DPRGS & MW & !AO # DPRGM & MWTC &
  !ADRO;
DPLORD = DPRGS & MR & !AO # DPRGM & MRDC &
  !ADRO;
!DPRMI = !Y1 # MRDC & DPAMCS & DPRGM # RST;
Y1 = MW & DPASCS & DPRGS # DPRMI;
!DPRSI = !Y2 # MR & DPASCS & DPRGS # RST;
Y2 = MWTC & DPAMCS & DPRGM # DPRSI;
```

TABLE III

LOGIC ARRAY CHIP 46-3

```
/** Inputs **/
PIN 1   = !DPRMCS  ;  /*          */
PIN 2   = !LOCKM   ;  /*          */
PIN 3   =  TEST    ;  /*          */
PIN 4   = !DPRGM   ;  /*          */
PIN 5   = !ADRO    ;  /*          */
PIN 6   = !BHEN    ;  /*          */
PIN 7   = !MRDC    ;  /*          */
PIN 8   = !MWTC    ;  /*          */
PIN 9   = !Q1      ;  /*          */
PIN 11  = !DPRSCS  ;  /*          */
/** Outputs **/
PIN 12  = CEI      ;  /*          */
PIN 13  = !Y       ;  /*          */
PIN 14  =  LOCKML  ;  /*          */
PIN 15  = !GX      ;  /*          */
PIN 16  = !G3      ;  /*          */
PIN 17  = !G2      ;  /*          */
PIN 18  = !DIR     ;  /*          */
PIN 19  = !G1      ;  /*          */
/** Tristate outputs **/
G1.OE       = !TEST;
G2.OE       = !TEST;
G3.OE       = !TEST;
GX.OE       = !TEST;
CEI.OE      = !TEST;
DIR.OE      = !TEST;
LOCKML.OE   = !TEST;
Y.OE        = !TEST;
```

TABLE IV

LOGIC ARRAY CHIP 46-4

```
/** Inputs **/
PIN Ä..3Ü=ÄA8..A10Ü      ;   /*          */
PIN Ä4..11Ü=!ÄA11..A18Ü  ;   /*          */
```

TABLE IV-continued

```
LOGIC ARRAY CHIP 46-4
PIN Ä13..17Ü=!ÄA19..A23Ü    ;    /*        */
PIN 20 =PERDPR0    ;    /*        */
PIN 21 =PERDPR1    ;    /*        */
PIN 22 =!RST       ;    /*        */
PIN 23 =!TEST2     ;    /*        */
/** Outputs **/
PIN 18 =!DPRMCS    ;    /*        */
PIN 19 =!DPAMCS    ;    /*        */
/** Declarations and Intermediate Variable Definitions **/
FIELD ADDRESS   =ÄA8..A19Ü;
ACT =!PERDPRO & !PERDPR1;
IBH =PERDPRO & !PERDPR1;
FULL   =!PERDPRO & PERDPR1;
NBT =PERDPRO & PERDPR1;
/** Tristate Equations **/
/** Logic Equations **/.
DPRMCS =!RST & !TEST2 &
(ACT & ADDRESS:Ä8F000..8FFFFÜ #
  IBH & ADDRESS:Ä78000..7FFFFÜ # FULL &
ADDRESS:ÄA0000..AFFFFÜ #
  NBT & ADDRESS:Ä49000..4FFFFÜ);
DPAMCS =!RST & !TEST2 &
(ACT & ADDRESS:Ä8FF00..8FFFFÜ #
  IBH & ADDRESS:Ä7FF00..7FFFFÜ # FULL &
ADDRESS:ÄAFF00..AFFFFÜ #
  NBT & ADDRESS:Ä49F00..4FFFFÜ);
/** Logic Equations **/
G3   =   DPRMCS & DPRGM & Q1 & MRDC &
BHEN # GX & BHEN & DPRMCS;
G2   =   DPRMCS & DPRGM & Q1 & MRDC & ADRO &
    !BHEN # GX & ADRO & !BHEN & DPRMCS;
G1   =   DPRMCS & DPRGM & Q1 & MRDC &
!ADRO # GX & !ADRQ & DPRMCS;
GX   =   DPRMCS & DPRGM & Q1 & MWTC # DPRMCS &
Q1 & GX;
!CEI  =  !DPRMCS & !DPRSCS;
DIR   =  MRDC # DIR & Q1 & DPRMCS & !MWTC;
Y     =  DPRMCS # LOCKML;
!LOCKML = !Y # !LOCKM;
```

I claim:

1. A control system, integrated into a single housing, for at least one numerically controlled machine, especially for a machine tool, the control system comprising:

a personal computer board including an input device, a processor, a memory and a bus connecting said input device, said processor and said memory to each other, said bus having a control line and data lines;

at least one CNC board including a processor, a memory, and a CNC-bus;

a single, common control-system bus having a control line and data lines and being connected to the CNC-bus of said at least one CNC board, and a personal computer matching circuit connected between the control-system bus and the bus of said personal computer board, said personal computer matching circuit including:

a read-write memory having data connections and a read-write switch-over input, an address multiplexer, an output side of which is connected to an address input of the read-write memory and an input side of which is connected to address lines of the control-system bus and also to address lines of the bus of said personal computer board, a bi-directional data multiplexer, one side of which is connected to the data connections of the read-write memory and another side of which is connected to the data lines of the control-system bus and also to the data lines of the bus of said personal computer board, and a control circuit having inputs thereof connected to the control lines of the control-system bus and the bus of said personal computer board, respectively and outputs thereof connected to switch-over inputs of the address multiplexer, the bi-directional data multiplexer and the read-write switch-over input of said read-write memory, respectively, said control circuit, in dependence on control signals in the control lines of said control-system bus and said bus of said personal computer board, driving said address multiplexer, said bi-directional data multiplexer, and said read-write memory in such fashion that, through said bus of said personal computer board, data under the desired address are written into and read out from said read-write memory.

2. The control system of claim 1, wherein said read-write memory, said address multiplexer, and said bi-directional data multiplexer are formed by a dual-port RAM.

3. The control system of claim 2, wherein at lest one I/O board is provided, which is connected to an axis driver of a machine tool and is also connected to said single common control-system bus, which delivers analog or digital driving signals for the axis driver of a machine tool.

4. The control system of claim 1, wherein at least one I/O board is provided, which is connected to an axis driver of a machine tool and which is also connected to said single, common control-system bus which delivers analog or digital driving signals for the axis driver of a machine tool.

5. The control system of claim 1, wherein said control circuit is formed by at least one programmable logic-gate-array chip.

6. The control system of claim 1, wherein said control-system bus is of a multibus type.

7. A control system of claim 1, wherein a plurality of CNC boards are provided.

* * * * *